(12) United States Patent
Khanka et al.

(10) Patent No.: US 8,570,883 B1
(45) Date of Patent: Oct. 29, 2013

(54) SELECTIVE POWER MODE CONTROL OF WIRELESS COMMUNICATION DEVICES

(75) Inventors: Bhagwan Singh Khanka, Lenexa, KS (US); Jasinder Pal Singh, Olathe, KS (US); Sachin R. Vargantwar, Overland Park, KS (US); Mark Edward Hanna, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1142 days.

(21) Appl. No.: 12/500,857

(22) Filed: Jul. 10, 2009

(51) Int. Cl.
*G01R 31/08* (2006.01)

(52) U.S. Cl.
USPC .......................... 370/252; 455/444; 455/450

(58) Field of Classification Search
USPC .......... 370/252, 330, 335, 441, 444; 455/522, 455/450, 422.1
See application file for complete search history.

(56) References Cited

U.S. PATENT DOCUMENTS

| 6,741,862 | B2 | 5/2004 | Chung et al. |
| 7,403,800 | B2 | 7/2008 | Han et al. |
| 7,408,894 | B2 * | 8/2008 | Kim et al. ...................... 370/318 |
| 2005/0124372 | A1 * | 6/2005 | Lundby et al. ................ 455/522 |
| 2007/0127407 | A1 * | 6/2007 | Attar et al. ..................... 370/318 |
| 2008/0032734 | A1 * | 2/2008 | Au et al. ........................ 455/522 |
| 2010/0124897 | A1 * | 5/2010 | Edge ........................... 455/404.1 |

* cited by examiner

*Primary Examiner* — Mark Rinehart
*Assistant Examiner* — Matthew Hopkins (57) ABSTRACT

A method of operating a wireless communication system includes transmitting a power control code from a wireless access node to each of plurality of wireless communication devices. In each of the plurality of wireless communication devices, the method includes transmitting user communications for receipt by the wireless access node at a first transmit power level as indicated by the power control code. The method also includes transmitting a power mode instruction from the wireless access node to a subset of the plurality of wireless communication devices. In each of the subset of the plurality of wireless communication devices, the method includes transmitting the user communications for receipt by the wireless access node at a second transmit power level as indicated by interpreting the power control code with the power mode instruction.

15 Claims, 7 Drawing Sheets

| WCD | NETWORK USER TYPE | POWER CONTROL CODE | POWER MODE INSTRUCTION | TRANSMIT DATA RATE |
|---|---|---|---|---|
| 310 | SPRINT | 1 | INVERT | LOW |
| 311 | ROAMER | 1 | N/A | HIGH |
| 312 | ROAMER | 1 | N/A | HIGH |
| 313 | SPRINT | 1 | INVERT | LOW |
| 314 | EMERGENCY | 1 | N/A | HIGH |

TABLE 500

SELECTIVE POWER MODE CONTROL OF WIRELESS COMMUNICATION DEVICES

TECHNICAL FIELD

Aspects of the disclosure are related to the field of communications, and in particular, transmission power control of wireless communication devices in wireless communication networks.

TECHNICAL BACKGROUND

Wireless communication networks typically include wireless communication devices which, via wireless access nodes, communicate over wireless links with further communication networks and equipment. In many examples of wireless communication systems, the wireless communication devices can receive overhead communications from the wireless access nodes in addition to exchanging user communications.

Many overhead communication portions are shared by all wireless communication devices in communication with a particular wireless access node. One example use of the shared overhead communications is power control, which can be used to control a transmit power level of the wireless communication devices. In examples of shared power control, a transmit power level for user communications is increased or decreased for all wireless communication devices simultaneously.

OVERVIEW

What is disclosed is a method of operating a wireless communication system. The method includes transmitting a power control code from a wireless access node to each of plurality of wireless communication devices. In each of the plurality of wireless communication devices, the method includes transmitting user communications for receipt by the wireless access node at a first transmit power level as indicated by the power control code. The method also includes transmitting a power mode instruction from the wireless access node to a subset of the plurality of wireless communication devices. In each of the subset of the plurality of wireless communication devices, the method includes transmitting the user communications for receipt by the wireless access node at a second transmit power level as indicated by interpreting the power control code with the power mode instruction.

What is also disclosed is a method of operating a wireless communication device. The method includes receiving a power control code from a wireless access node, determining a first transmit power level as indicated by the power control code, and transmitting user communications at the first transmit power level. The method also includes receiving a power mode instruction from the wireless access node, determining a second transmit power level by interpreting the power control code according to the power mode instruction, and transmitting the user communications at the second transmit power level.

What is also disclosed is a wireless communication device. The wireless communication device includes a transceiver configured to receive a power control code from a wireless access node, and a power controller configured to determine a first transmit power level as indicated by the power control code and instruct the transceiver to transmit user communications at the first transmit power level, where the transceiver is configured to transmit the user communications at the first transmit power level. The transceiver is configured to receive a power mode instruction from the wireless access node, and the power controller is configured to determine a second transmit power level by interpreting the power control code according to the power mode instruction and instruct the transceiver to transmit the user communications at a second transmit power level, where the transceiver is configured to transmit the user communications at the second transmit power level. In some examples, the power control code comprises a power control bit.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
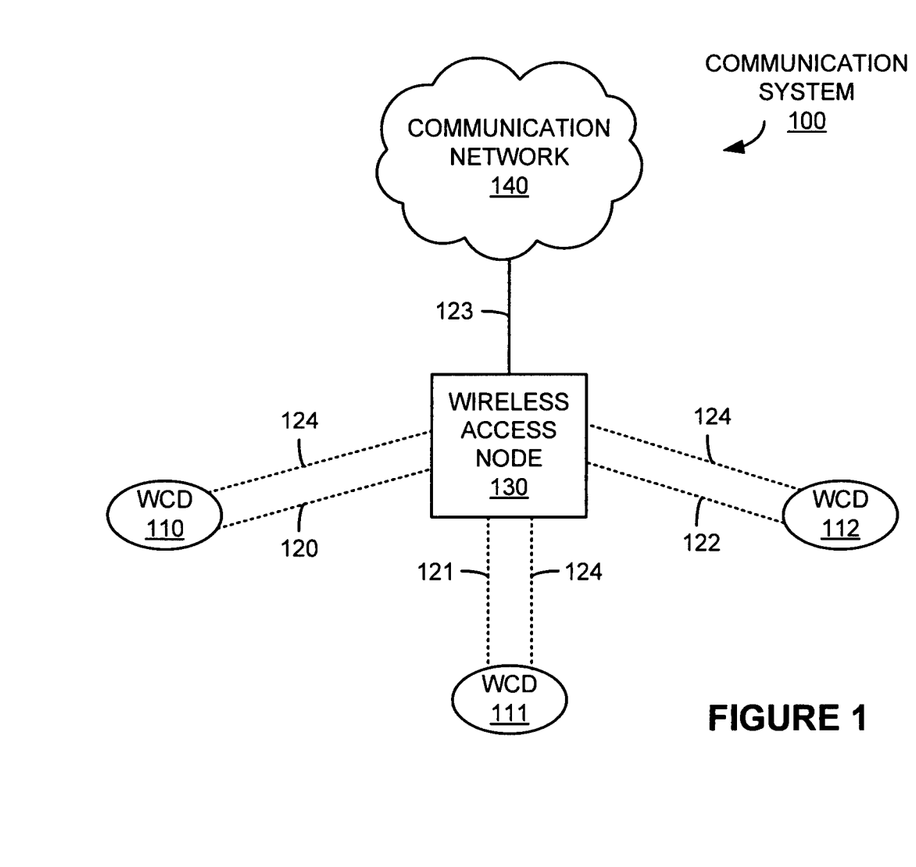
FIG. 1 is a system diagram illustrating a communication system.

FIG. 1 is a system diagram illustrating communication system 100. Communication system 100 includes wireless communication devices (WCD) 110-112, wireless access node 130, and communication network 140. Wireless communication devices 110-112 and wireless access node 130 communicate over wireless links 120-122, respectively. Wireless access node 130 can also communicate with wireless communication devices 110-112 over shared wireless link 124. Wireless access node 130 and communication network 140 communicate over link 123. In FIG. 1, each wireless communication device 110-112 can individually exchange user communications with wireless access node 130 over wireless links 120-122, respectively. Wireless communication devices 110-112 can also exchange overhead communications with wireless access node 130 over shared wireless link 124. Shared wireless link 124 can include overhead communications related to each wireless link 120-122.

Figure 2:
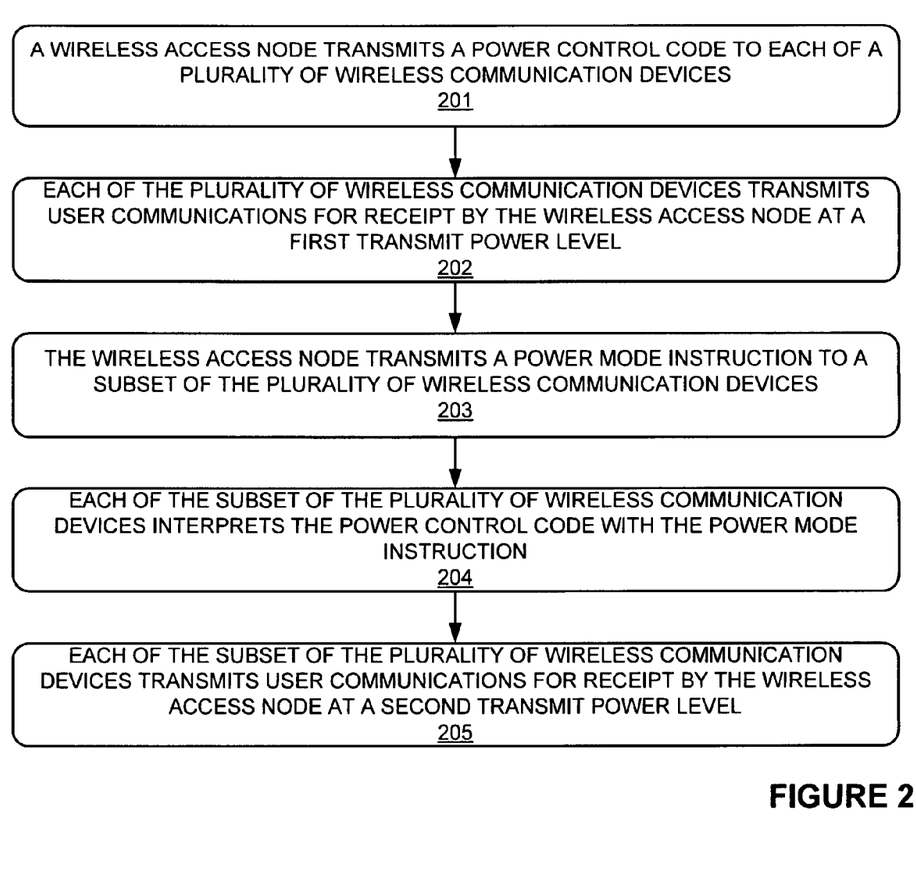
FIG. 2 is a flow diagram illustrating a method of operation of a communication system.

FIG. 2 is a flow diagram illustrating a method of operation of communication system 100. The operations of FIG. 2 are referenced herein parenthetically. In FIG. 2, wireless access node 130 transmits (201) a power control code to each wireless communication device 110-112. In many examples, the power control code is a power control data bit included in overhead communications between wireless access node 130 and wireless communication devices 110-112 over shared wireless link 124, although other types of power control codes could be used. Each wireless communication device 110-112 transmits (202) user communications for receipt by wireless access node 130 at a first transmit power level as indicated by the power control code. Each wireless communication device 110-112 could exchange further user communications and overhead communications with wireless access node 130.

Wireless access node 130 then transmits (203) a power mode instruction to a subset of wireless communication devices 110-112. The power mode instruction could include instructions on how to interpret the power control code, among other information. Each of the subset of wireless communication devices 110-112 which received the power mode instruction then interprets (204) the power control code as indicated by the power mode instruction. After interpreting the power control code, each of the subset of wireless communication devices 110-112 transmits (205) further user communications for receipt by wireless access node 130 at a second transmit power level as indicated by interpreting the power control code with the power mode instruction. It should be understood that the subset of wireless communication devices 110-112 could include any combination of wireless communication devices 110-112.

In many examples, the first and second transmit power levels also correspond to a transmit data bandwidth or data rate for the user communications, where the data bandwidth could include a range of data bandwidths for each of the first and second transmit power levels. For example, the first transmit power level could correspond to a high transmit power level and high data bandwidth range, and the second transmit power level could correspond to a low transmit power level and low data bandwidth range. In further examples, the first transmit power level could correspond to a low transmit power level and low data bandwidth range, and the second transmit power level could correspond to a high transmit power level and high data bandwidth range.

Referring back to FIG. 1, wireless communication devices (WCD) 110-112 each comprise radio frequency (RF) communication circuitry and an antenna. The RF communication circuitry typically includes amplifiers, filters, modulators, and signal processing circuitry. In many examples, wireless communication devices 110-112 each include circuitry and equipment to receive power control codes and instructions from wireless access node 130 and exchange user communications with wireless access node 130 over wireless links. Wireless communication devices 110-112 may also each include a user interface, memory device, computer-readable storage medium, software, processing circuitry, or some other communication components. Wireless communication devices 110-112 may each be a telephone, mobile wireless telephone, computer, e-book, mobile Internet appliance, wireless network interface card, media player, game console, or some other wireless communication apparatus, including combinations thereof. Although three wireless communication devices are shown in FIG. 1, it should be understood that a different number of wireless communication devices could be in communication with wireless access node 130.

Wireless access node 130 comprises RF communication and control circuitry and an antenna. The RF communication circuitry typically includes amplifiers, filters, RF modulators, and signal processing circuitry. In many examples, wireless access node 130 includes equipment to wirelessly transfer power control codes and instructions to wireless communication devices, exchange user communications with wireless communication devices 110-112 over wireless links 120-122, and route user communications between core network 140 and wireless communication devices 110-112. Wireless access node 130 may also comprise a router, server, memory device, software, processing circuitry, cabling, power supply, network communication interface, physical structural support, or some other communication apparatus. Wireless access node 130 could be a base station, base transceiver station, Internet access node, telephony service node, wireless data access point, or some other wireless communication system, including combinations thereof. In typical examples, wireless access node 130 has a limited geographic coverage area over which it can provide communication services to wireless communication devices.

Communication network 140 comprises the core network of a wireless communications provider, and could include routers, gateways, telecommunication switches, processing systems, or other communications equipment and systems for providing communication and data services. Communication network 140 may also comprise optical networks, asynchronous transfer mode (ATM) networks, packet networks, metropolitan-area networks (MAN), or other network topologies, equipment, or systems, including combinations thereof. In some examples, communication network 140 includes further wireless access nodes and associated equipment for providing communication services to many wireless communication devices across a geographic region.

Wireless links 120-122 and 124 each use the air or space as the transport media. Wireless links 120-122 and 124 may each use various protocols, such as Code Division Multiple Access (CDMA), Evolution Data Optimized (EVDO), Worldwide Interoperability for Microwave Access (WIMAX), Global System for Mobile Communication (GSM), Universal Mobile Telecommunications System (UMTS), Long Term Evolution (LTE), Wireless Fidelity (WIFI), High Speed Packet Access (HSPA), or some other wireless communication format, including combinations, improvements, or variations thereof.

Communication link 123 uses metal, glass, optical, air, space, or some other material as the transport media. Communication link 123 could use various communication protocols, such as Time Division Multiplex (TDM), asynchronous transfer mode (ATM), Internet Protocol (IP), Ethernet, synchronous optical networking (SONET), communication signaling, or some other communication format, including combinations, improvements, or variations thereof.

Communication links 120-124 may each include many different signals sharing the same link—as represented by the associated lines in FIG. 1—comprising access channels, forward links, reverse links, user communications, communication sessions, overhead communications, frequencies, timeslots, transportation ports, logical transportation links, network sockets, packets, or communication directions. Communication link 123 could be a direct link or may include intermediate networks, systems, or devices. In many examples, the portion of wireless links 120-122 and 124 as transmitted by the associated wireless communication device is referred to an uplink or reverse link of the wireless link, while the portion as transmitted by wireless access node 130 is referred to as a downlink or forward link of the wireless link.

Figure 3:
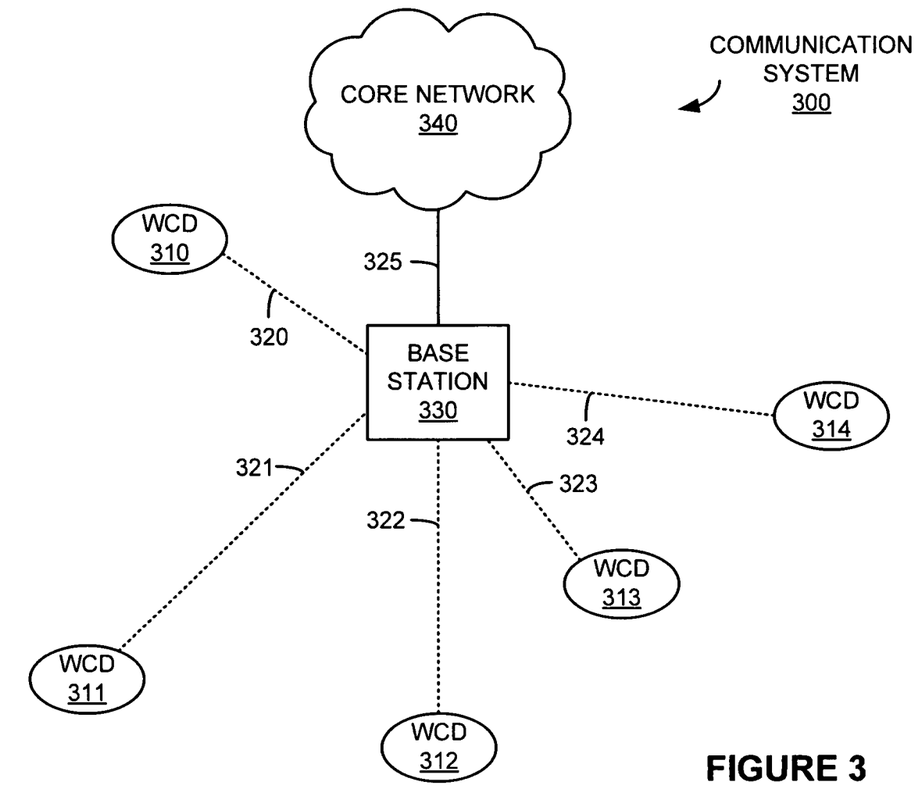
FIG. 3 is a system diagram illustrating a communication system.

FIG. 3 is a system diagram illustrating communication system 300. Communication system 300 includes wireless communication devices (WCD) 310-314, base station 330, and core network 340. WCD 310-314 communicate with base station 330 over wireless links 320-324, respectively. Base station 330 and core network 340 communicate over link 325.

WCD 310-314 are user devices, and comprise mobile wireless telephones in this example. Base station 330 comprises RF communication and control circuitry and an antenna, and includes wireless communications equipment capable of communicating with and providing communication service to wireless communication devices. Core network 340 is a core network of a wireless communication provider in this example. Core network 340 could include further base stations, routers, gateways, controller systems, processing systems, or other communication equipment. Wireless links 320-324 employ the CDMA wireless protocol, and link 325 is a T1 link in this example. In this example, wireless links 320-324 can each exchange at least both user communications and overhead communications.

Figure 4:
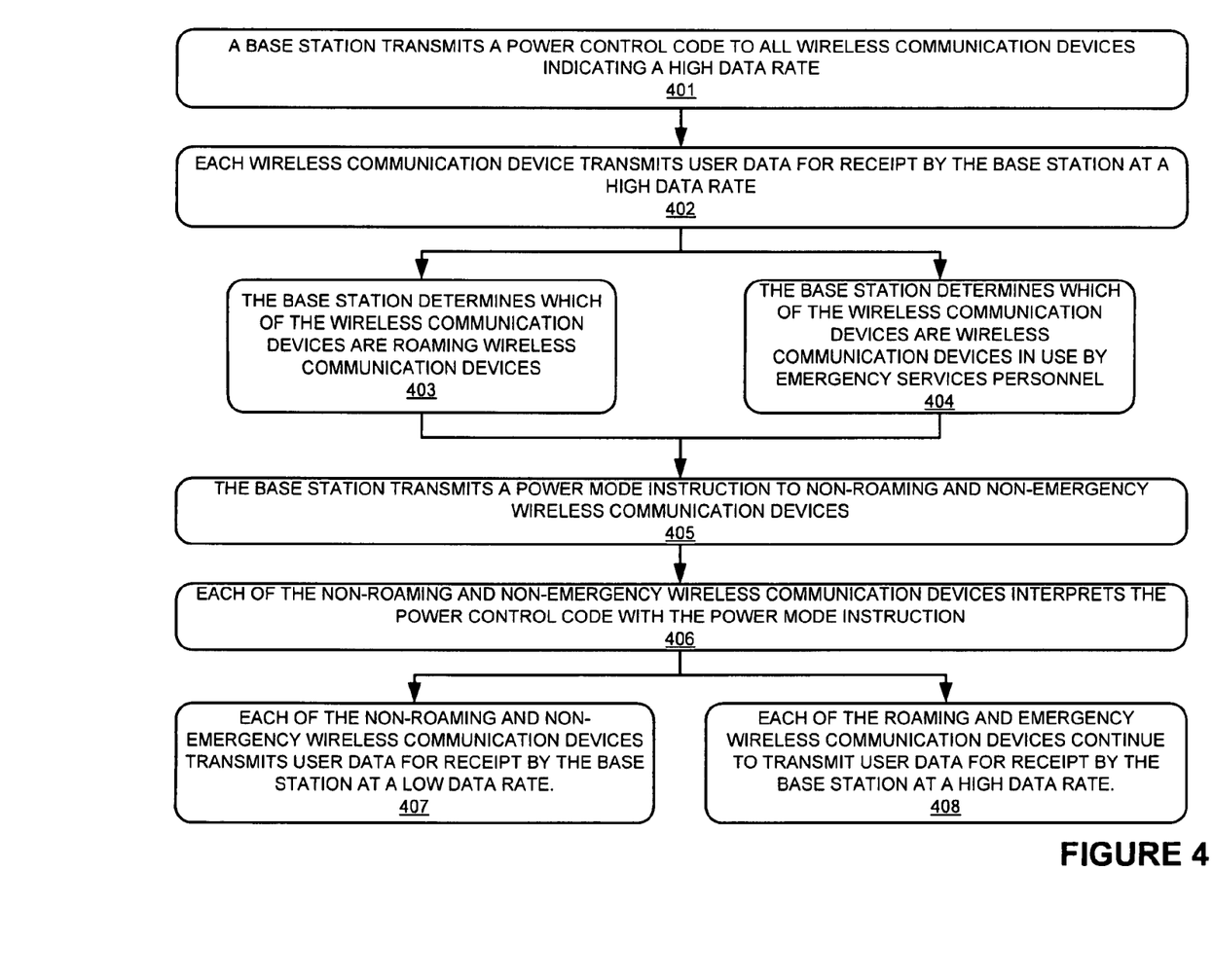
FIG. 4 is a flow diagram illustrating a method of operation of a communication system.

FIG. 4 is a flow diagram illustrating a method of operation of communication system 300. The operations of FIG. 4 are referenced herein parenthetically. In FIG. 4, base station 330 transmits (401) a power control code to all wireless communication devices in communication with base station 330, specifically WCD 310-314. In this example, the power control code comprises a power control bit, specifically a reverse-link activity bit (RAB) of the CDMA protocol. The RAB is a single bit of information which globally indicates to all wireless communication devices in communication with base station 330 to transmit communications over an associated reverse link at a certain data rate or data bandwidth. Also, for this example, a '1' value of the RAB bit indicates a high transmit data rate and a '0' value of the RAB bit indicates a low transmit data rate. As discussed herein, this data rate can also correspond to a certain transmit power level. Table 500 illustrated in FIG. 5 includes WCD 310-314 and associated attributes. As shown in table 500, the RAB bit value is a '1' for all wireless communication devices in communication with base station 330. Thus, since the RAB bit indicates to each WCD 310-314 to transmit at a high data rate in this example, each WCD 310-314 accordingly transmits (402) user communications for receipt by base station 330 at a high data rate. In this example, the user communications include user data.

Figure 5:
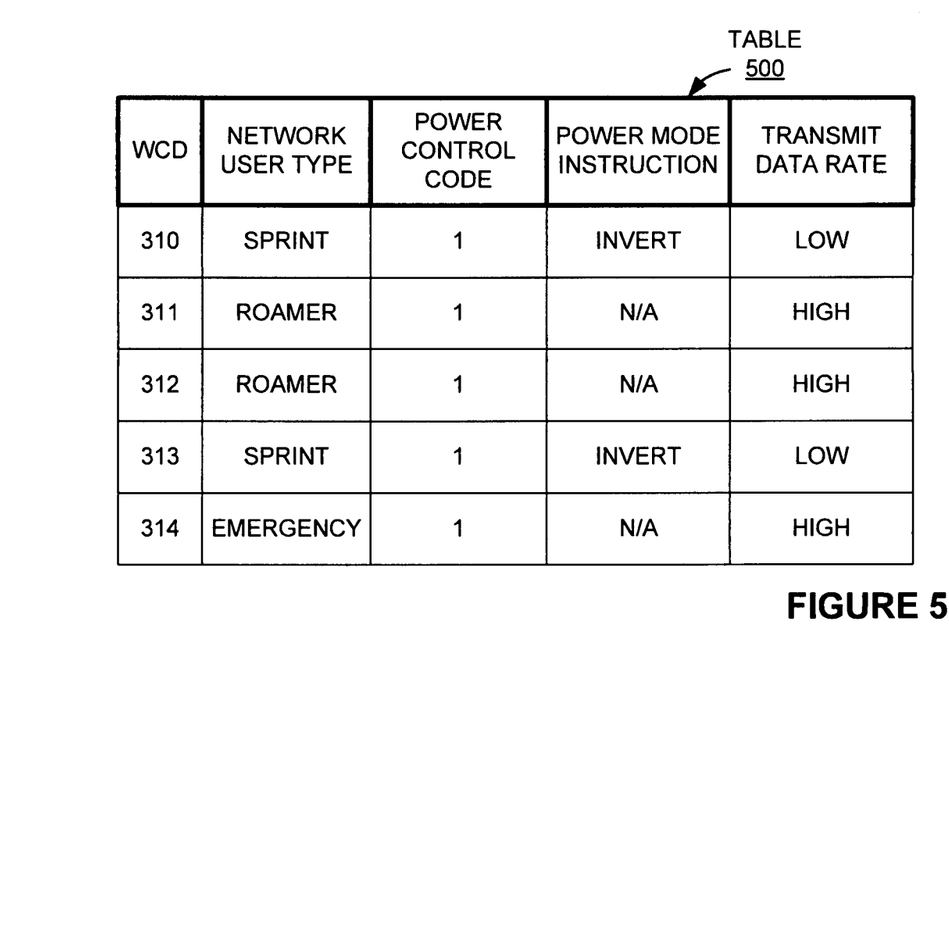
FIG. 5 is a table illustrating example power mode parameters.

Base station 330 determines (403) which of WCD 310-314 are roaming wireless communication devices and determines (404) which of WCD 310-314 are wireless communication devices in use by emergency services personnel. In many examples, wireless communication devices in use by emergency services personnel are operated by an emergency service provider, such as police, fire, first responder, or other emergency service providers. A roamer WCD typically includes wireless communication devices that are using base station 330 but are not a customer of the wireless communications provider which operates base station 330. As shown in table 500, WCD 311 and WCD 312 are roamer WCDs, and WCD 314 is associated with emergency services personnel. In this example, base station 330 is operated by the Sprint wireless communications provider, and WCD 310 and WCD 313 are registered for use by Sprint customers. In contrast, roamer WCDs 311-312 are not in use by Sprint customers and thus would be using a different wireless communications provider.

Base station 330 transmits (405) a power mode instruction to non-roaming and non-emergency wireless communication devices. In this example, the non-roaming and non-emergency are WCD 310 and WCD 313, and are both Sprint customers. Each of the non-roaming and non-emergency wireless communication devices, i.e. WCD 310 and WCD 313, interprets (406) the power control code with the power mode instruction. As discussed above, the power control code is a RAB bit. The power mode instruction, in this example, includes an instruction to invert the RAB bit as received from base station 330. Therefore, each wireless communication device that receives the power mode instruction will invert the RAB bit and consequently transmit user data at a low data rate. Also, since this data rate can also correspond to a certain transmit power level, WCD 310 and WCD 313 each transmits (407) user data for receipt by base station 330 at a low power level. As shown in table 500 in FIG. 5, WCD 310 and WCD 313 invert the power control code according to the power mode instruction, while WCD 311-312 and WCD 314 do not invert the power control code. Thus, roaming and emergency services wireless communication devices continue to transmit (408) at a higher data rate, and have a correspondingly higher transmit power level for user data transmitted for receipt by base station 330.

Although, in this example, a RAB bit value of '1' is used to indicate a high transmit data rate, it should be understood that a value of '1' could correspond to a low transmit data rate. Also, it should be understood that a RAB bit value of '0' could also be used in a similar manner. For example, a RAB bit value of '1' could correspond to a low transmit data rate, while a RAB bit value of '0' could correspond to a high transmit data rate. Correspondingly, the subset of wireless communication devices which receive the power mode instruction could be instructed to transmit user data at a higher transmit data rate, and the wireless communication devices which do not receive the power mode instruction could continue to transmit user data at a lower data rate.

In further examples, base station 330 processes a current noise level to determine to transmit the power mode instructions. The noise level, as detected by base station 330, could be a signal-to-noise ratio, a noise rise caused by user data of wireless communication devices in communication with base station 330, or other noise source or metric. If, for example, the noise level is determined to be at a low level, base station 330 could then determine to send the power control code to allow WCD 310-314 to transmit user data at a high power level, and thus a correspondingly high data bandwidth or data rate. Base station 330 could then select a subset of individual wireless communication devices to transmit at a lower transmit power level, or at a correspondingly lower data bandwidth or data rate, by selectively transferring the power mode instruction to the subset of wireless communication devices.

Advantageously, in examples of a shared power control code, such as a global RAB bit, individual wireless communication devices can have their reverse link, or transmit, data rates controlled by base station 330 via interpreting a separate power mode instruction. This selective control over the transmit data rates of wireless communication devices could be employed to give a higher data rate to users who receive a higher level of service, or who are of a higher quality-of-service level, than other wireless communication devices. This higher data rate can be especially helpful for emergency services users to receive adequate bandwidth or higher transmit power to facilitate the emergency operations.

In some examples, the power mode instruction is a part of a shared overhead or control communication exchanged between base station 330 and WCD 310-314, such as in an access parameter message (APM) or system parameter message (SPM). In other examples, the power mode instruction could be a part of user communications exchanged between base station 330 and WCD 310-314. Wireless communication devices may include modified or additional systems or circuitry to properly detect and interpret the power mode instruction. Advantageously, the power mode instruction would ignored by wireless communication devices not incorporating such modifications, while used by wireless communication devices which include the additional systems or circuitry. In this manner, wireless communication devices of a particular wireless communication service provider could be modified to detect and interpret the power mode instruction, while wireless communication devices of other wireless communication service providers would not be modified to detect and interpret power mode instruction.

Also, in examples of typical wireless communication protocols used over wireless links, the protocols have become standardized. This standardization allows wireless communication devices from many different manufacturers or communication providers to work properly across many different communication networks and wireless access nodes or base stations. It can be difficult to modify an existing standardized communication protocol, as changes could affect many different users and communication providers. Advantageously, by transferring the power mode instruction to selective wireless communication devices which have been modified to detect and interpret the power mode instruction, the data rates of the selective wireless communication devices could be affected without modifying an existing wireless communication protocol.

Figure 6:
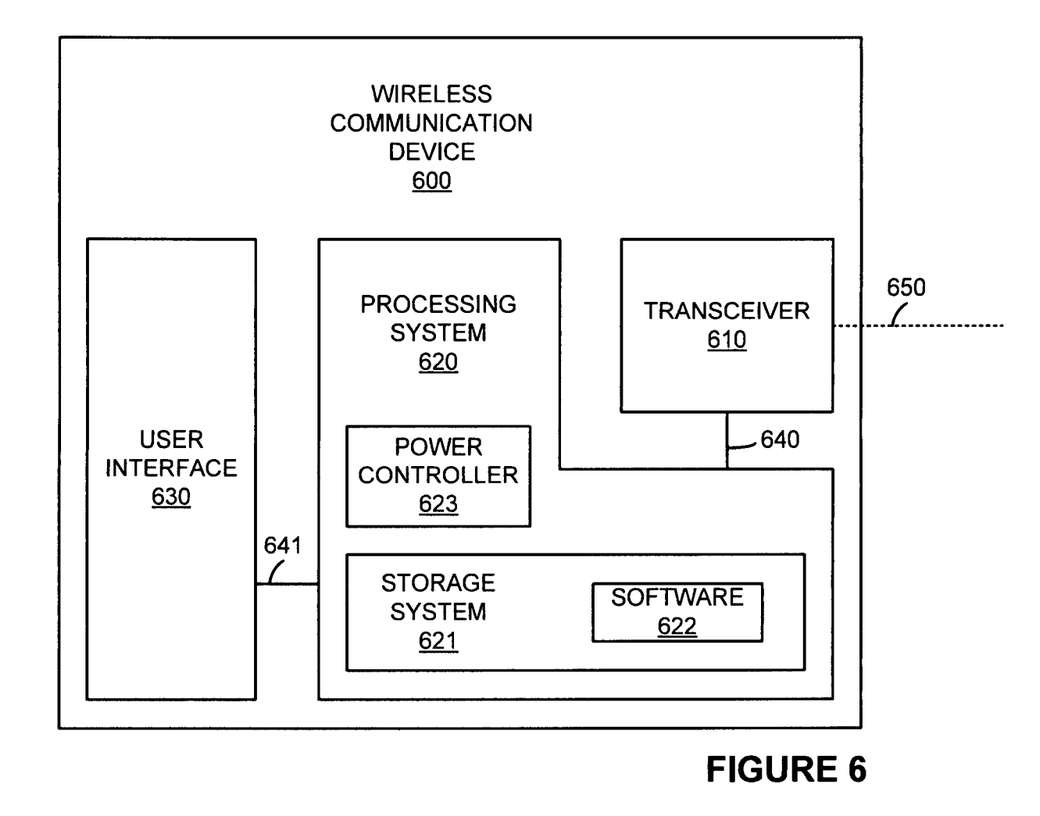
FIG. 6 is a block diagram illustrating a wireless communication device.

FIG. 6 is a block diagram illustrating an example of wireless communication device 600, as an example of WCD 110-112 found in FIG. 1 or WCD 310-314 found in FIG. 3, although WCD 110-112 or WCD 310-314 could use other configurations. Wireless communication device 600 includes transceiver 610, processing system 620, and user interface 630. Transceiver 610 and processing system 620 communicate over link 640. User interface 630 and processing system 620 communicate over link 641. Transceiver 610 communicates with a wireless access node, omitted for clarity, over wireless link 650. Wireless communication device 600 may be distributed among multiple devices that together form elements 610, 620-623, 630, and 640-641. Transceiver 610 comprises radio frequency (RF) communication circuitry and an antenna. Transceiver 610 could also include amplifiers, filters, modulators, and signal processing circuitry. In this example, transceiver 610 can receive power level instructions from processing system 620.

Processing system 620 includes storage system 621 and power controller 623. Processing system 620 retrieves and executes software 622 from storage system 621. Power controller 623 could incorporate a computer microprocessor, logic circuit, or some other processing device, and may be distributed among multiple processing devices. In some examples, processing system 620 or user interface 630 are located within the same equipment in which transceiver 610 is located. Storage system 621 could include a computer-readable medium such as a disk, tape, integrated circuit, server, or some other memory device, and also may be distributed among multiple memory devices. Software 622 may include an operating system, logs, utilities, drivers, networking software, and other software typically loaded onto a computer system. Software 622 could contain an application program, firmware, or some other form of computer-readable processing instructions. When executed by power controller 623, software 622 directs power controller 623 to operate as described herein.

User interface 630 includes equipment and circuitry for receiving user input and control. Examples of user interface 630 include push buttons, selection knobs, dials, switches, actuators, keys, keyboards, pointer devices, microphones, transducers, potentiometers, non-contact sensing circuitry, or other human-interface equipment. In some examples, user interface 630 also includes equipment to communicate information to a user of wireless communication device 600. Examples of the equipment to communicate information to the user could include indicator lights, lamps, light-emitting diodes, displays, haptic feedback devices, audible signal transducers, speakers, buzzers, alarms, or other indicator equipment, including combinations thereof.

Links 640-641 each comprises a physical, logical, or virtual communication link, capable of communicating data, control signals, and communications, along with other information. In some examples, links 640-641 are each encapsulated within the elements of transceiver 610, processing system 620, or user interface 630, and may each be a software or logical link. In other examples, links 640-641 each use various communication media, such as air, space, metal, optical fiber, or some other signal propagation path, including combinations thereof. Links 640-641 could be direct links or might include various equipment, intermediate components, systems, and networks. Wireless link 650 could use various protocols or communication formats as described herein for wireless links 120-122, including combinations, variations, or improvements thereof. In this example, wireless link 650 can exchange user communications and overhead communications.

Figure 7:
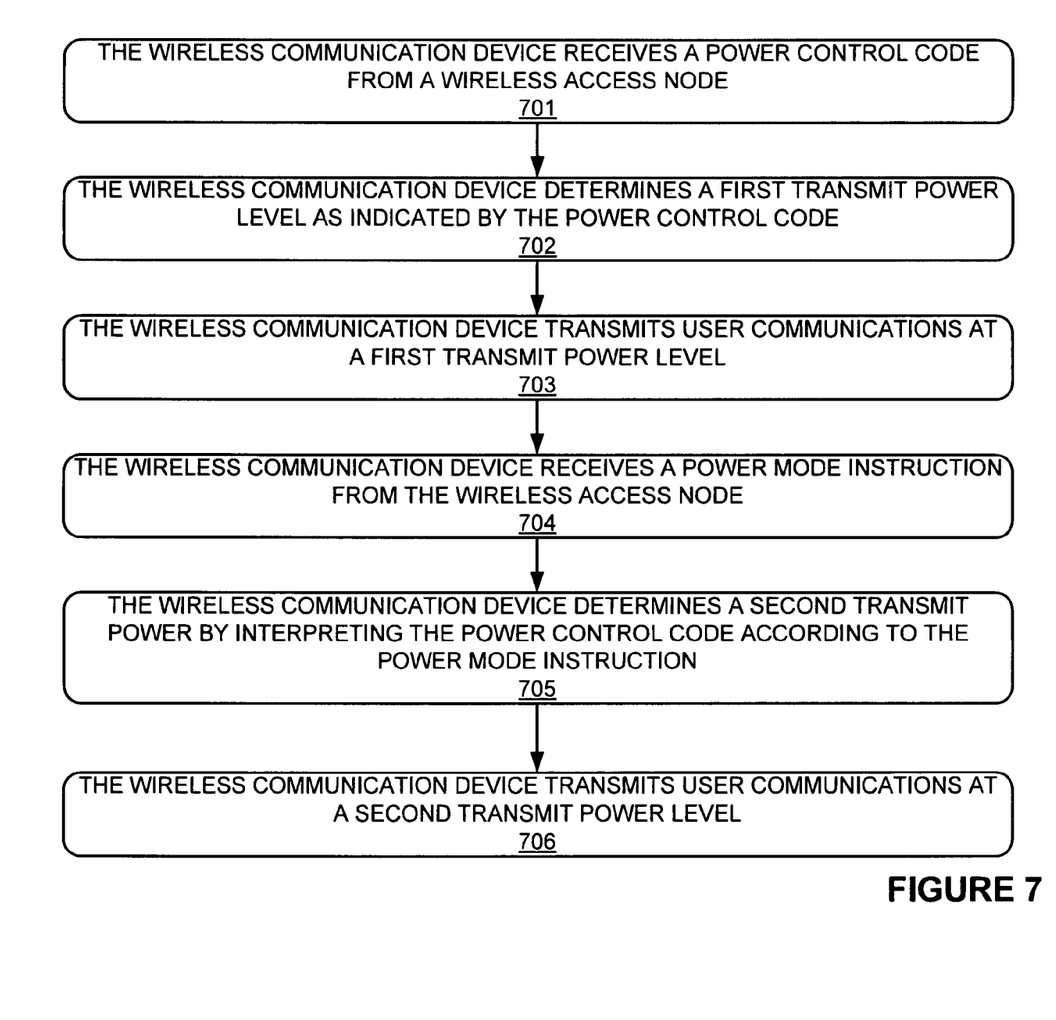
FIG. 7 is a flow diagram illustrating a method of operation of a wireless communication device.

FIG. 7 is a flow diagram illustrating a method of operation of wireless communication device 600. The operations of FIG. 7 are referenced herein parenthetically. In FIG. 7, wireless communication device 600 receives (701) a power control code from a wireless access node. In this example, the power control code would be received by transceiver over 610 wireless link 650 from a wireless access node, which is not shown for clarity in FIG. 6. Processing system 620 of wireless communication device 600 determines (702) a first transmit power level as indicated by the power control code, and transceiver 610 of wireless communication device 600 transmits (703) user communications at the first transmit power level over wireless link 650. Then, transceiver 610 of wireless communication device 600 receives (704) a power mode instruction from the wireless access node over wireless link 650. Processing system 620 of wireless communication device 600 determines (705) a second transmit power by interpreting the power control code according to the power mode instruction, and transceiver 610 of wireless communication device 600 transmits (706) user communications at the second transmit power level. In this example, power controller 623 of processing system 620 could determine the first and second power levels and interpret the power control code according to the power mode instruction. Power controller 623 could also instruct transceiver 610 to transmit at the first transmit power level or the second transmit power level.

In many examples, the first and second transmit power levels also correspond to a transmit data bandwidth or data rate for the user communications, where the data bandwidth could include a range of data bandwidths for each of the first and second transmit power levels. For example, the first transmit power level could correspond to a high transmit power level and high data bandwidth range, and the second transmit power level could correspond to a low transmit power level and low data bandwidth range. In further examples, the first transmit power level could correspond to a low transmit power level and low data bandwidth range, and the second transmit power level could correspond to a high transmit power level and high data bandwidth range.

FIGS. 1-7 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication system, the method comprising:
   transmitting a power control code comprising a power control bit from a wireless access node to each of plurality of wireless communication devices;
   in each of the plurality of wireless communication devices, transmitting user communications for receipt by the wireless access node at a first transmit power level as indicated by the power control code;
   transmitting a power mode instruction from the wireless access node to a subset of the plurality of wireless communication devices comprising wireless communication devices operated by an emergency service provider;
   in each of the subset of the plurality of wireless communication devices, transmitting the user communications for receipt by the wireless access node at a second transmit power level as indicated by inverting the power control bit responsive to the power mode instruction.

2. The method of claim 1, wherein the power control bit comprises a reverse activity bit (RAB).

3. The method of claim 1, wherein the first transmit power level indicates a lower power level than the second transmit power level.

4. The method of claim 1, wherein the first transmit power level and the second transmit power level are each associated with a different transmit bandwidth of the user communications.

5. The method of claim 1, wherein the subset of the plurality of wireless communication devices further comprises wireless communication devices that are roaming devices in a wireless coverage area associated with the wireless access node.

6. The method of claim 1, wherein the subset of the plurality of wireless communication devices further comprises wireless communication devices with a higher quality of service level than the wireless communication devices not of the subset.

7. The method of claim 1, further comprising:
   processing a noise level associated with communications of the plurality of wireless communication devices as received by the wireless access node to determine when to transmit the power mode instruction.

8. A method of operating a wireless communication device of an emergency service provider, the method comprising:
   receiving a power control code comprising a power control bit from a wireless access node;
   determining a first transmit power level as indicated by the power control code;
   transmitting user communications at the first transmit power level;
   receiving a power mode instruction from the wireless access node;
   determining a second transmit power level by inverting the power control bit responsive to the power mode instruction; and
   transmitting the user communications at the second transmit power level.

9. The method of claim 8, wherein the power control bit comprises a reverse activity bit (RAB).

10. The method of claim 8, wherein the first transmit power level indicates a lower power level than the second transmit power level.

11. The method of claim 8, wherein the first transmit power level and the second transmit power level are each associated with a different transmit bandwidth of the user communications.

12. A wireless communication device of an emergency service provider, comprising:
   a transceiver configured to receive a power control code comprising a power control bit from a wireless access node;
   a power controller configured to determine a first transmit power level as indicated by the power control code and instruct the transceiver to transmit user communications at the first transmit power level;
   the transceiver configured to transmit the user communications at the first transmit power level;
   the transceiver configured to receive a power mode instruction from the wireless access node;
   the power controller configured to determine a second transmit power level by inverting the power control bit responsive to the power mode instruction and instruct the transceiver to transmit the user communications at a second transmit power level; and
   the transceiver configured to transmit the user communications at the second transmit power level.

13. The wireless communication device of claim 12, wherein the power control bit comprises a reverse activity bit (RAB).

14. The wireless communication device of claim 12, wherein the first transmit power level indicates a lower power level than the second transmit power level.

15. The wireless communication device of claim 12, wherein the first transmit power level and the second transmit power level are each associated with a different transmit bandwidth of the user communications.

* * * * *